(12) United States Patent
Kaszubowski et al.

(10) Patent No.: US 11,984,676 B2
(45) Date of Patent: May 14, 2024

(54) ELECTRICAL CONNECTION FOR MOTOR VEHICLE CABLE

(71) Applicant: Auto-Kabel Management GmbH, Hausen i.W. (DE)

(72) Inventors: Franz-Heinz Kaszubowski, Wassenberg (DE); Amir Hossein Attarzadeh, Mönchengladbach (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/549,619

(22) PCT Filed: Mar. 2, 2022

(86) PCT No.: PCT/EP2022/055283
§ 371 (c)(1),
(2) Date: Sep. 8, 2023

(87) PCT Pub. No.: WO2022/189229
PCT Pub. Date: Sep. 15, 2022

(65) Prior Publication Data
US 2024/0097363 A1 Mar. 21, 2024

(30) Foreign Application Priority Data
Mar. 10, 2021 (DE) .................. 10 2021 105 747.7

(51) Int. Cl.
*F16B 35/04* (2006.01)
*H01R 4/02* (2006.01)
(Continued)

(52) U.S. Cl.
CPC .............. *H01R 11/26* (2013.01); *F16B 35/04* (2013.01); *H01R 4/023* (2013.01); *H01R 43/0207* (2013.01); *H01R 2201/26* (2013.01)

(58) Field of Classification Search
CPC ........ F16B 5/0283; F16B 33/02; F16B 35/04; F16B 35/041; H01R 4/023; H01R 11/26; H01R 43/0207; H01R 2201/26
(Continued)

(56) References Cited

U.S. PATENT DOCUMENTS 4,075,923 A * 2/1978 Latham ................. F16B 31/043
411/548
5,118,236 A * 6/1992 Rodriguez, II .... H01R 13/6315
411/389
(Continued)

FOREIGN PATENT DOCUMENTS

DE       79 07 821 U1    7/1979
DE    20 2013 010 142 U1   1/2014
(Continued)

OTHER PUBLICATIONS

International Searching Authority/EP, International Search Report and Written Opinion of the International Searching Authority, Application No. PCT/EP2022/055283, dated Jun. 20, 2022, 16 pages (with translation of the International Search Report).
(Continued)

*Primary Examiner* — Roberta S Delisle
(74) *Attorney, Agent, or Firm* — Sunstein LLP

(57) ABSTRACT

A connection comprising, a connecting part, a sleeve materially bonded to the connecting part and having a through-opening extending in a longitudinal direction, and a bolt connected to the sleeve and having a bolt shank and a bolt flange, the bolt being crimped with its bolt shank in the longitudinal direction in the through-opening of the sleeve, the bolt is arranged with its bolt flange in a recess arranged at a front face of the sleeve, characterized in that the sleeve is connected to the connecting part by its front face located at the front face end.

13 Claims, 12 Drawing Sheets

(51) Int. Cl.
*H01R 11/26* (2006.01)
*H01R 43/02* (2006.01)

(58) Field of Classification Search
USPC .................. 411/381–382, 383, 395, 411, 424
See application file for complete search history.

(56) References Cited

U.S. PATENT DOCUMENTS

| | | | | |
|---|---|---|---|---|
| 6,357,953 | B1 * | 3/2002 | Ballantyne | F16B 5/0233 |
| | | | | 403/372 |
| 6,382,078 | B1 * | 5/2002 | Numata | F15B 15/262 |
| | | | | 411/383 |
| 8,545,152 | B2 * | 10/2013 | Kuenkel | F16B 35/041 |
| | | | | 411/326 |
| 2002/0102886 | A1 | 8/2002 | Costa | |
| 2004/0265090 | A1 * | 12/2004 | Stone | F16B 35/041 |
| | | | | 411/338 |
| 2011/0209542 | A1 * | 9/2011 | Hucker | G01F 1/684 |
| | | | | 73/273 |

FOREIGN PATENT DOCUMENTS

| | | |
|---|---|---|
| DE | 10 2017 005 807 A1 | 1/2018 |
| DE | 20 2018 100 111 U1 | 9/2018 |
| DE | 10 2017 116 879 A1 | 12/2018 |
| WO | 2009/098412 A2 | 8/2009 |

OTHER PUBLICATIONS

German Patent Office, Office Action, Application No. 10 2021 105 747.7, dated Oct. 22, 2021, 6 pages (in German).

* cited by examiner

ELECTRICAL CONNECTION FOR MOTOR VEHICLE CABLE

CROSS-REFERENCE TO RELATED APPLICATIONS

This application is the national phase entry of international patent application no. PCT/EP2022/055283, filed Mar. 2, 2022, and claims the benefit of German patent application No. 10 2021 105 747.7, filed Mar. 10, 2021, the disclosures of which are incorporated herein by reference in their entirety.

TECHNICAL FIELD

The subject matter relates to an electrical connection, in particular a connection between a connecting part and a flat part.

BACKGROUND ART

In electrical connection technology, especially in automotive applications, it is common practice to realize detachable connections between two electrical conductors by means of a bolt arranged on one of the conductors. A bolt is arranged on a flat surface of one of the conductors and is used for screwing to the other conductor. A bolt can be arranged on a conductor either as a through bolt through a hole in the conductor or as a welding bolt. A welding bolt is welded to a flat surface of a conductor, for example by means of friction welding, in particular rotary friction welding. The second conductor can then be placed on the welding bolt and screwed to the first conductor via a nut screwed to the bolt. The conductors are pressed against each other by the contact force of the nut and an electrically conductive path is formed between the conductors primarily via their immediate contact surface as well as via the bolt.

The conductor onto which the bolt is welded is usually a flat part, in particular a flat conductor or an electrical attachment part with a flat surface. In the field of power cables, copper conductors are usually used. Aluminum conductors are also possible. In order to avoid contact corrosion at the transition between the conductor and the bolt and thus ensure a long-lasting stable connection, the bolt is usually made of the same material as the conductor. For aluminum connections, the connection should be protected against environmental influences so that it is protected against contact corrosion. This is usually copper, so both bolt and conductor should be formed from copper or a copper alloy.

While copper has very good electrical and thermal conductivity, which is beneficial to the connection itself, copper is relatively ductile. This means that when the second conductor is bolted to the first conductor via the bolt, the tightening torque of the nut must not be too high. If a high tightening torque is required, there is always a risk that the thread of the bolt will shear off. Also with dynamic loads in continuous operation, such shear forces can occur on the thread that it shears off. This is particularly problematic when copper is used. On the other hand, the use of a bolt made of steel, in particular stainless steel, results in very good mechanical stability of a screw connection.

However, this increased mechanical stability compared with a bolt made of copper is "bought" by reduced electrical conductivity via the bolt. The bolt represents a relevant contact resistance at the junction of the conductors connected via the bolt.

The subject matter was thus based on the object of providing an electrical connection which meets increased mechanical requirements while maintaining the same electrical quality.

SUMMARY OF THE INVENTION

The connection comprises at least one connecting part. Such a connecting part can be formed as a strip or sheet. The connecting part is thereby in particular a flat conductor or a flat region of a round conductor. For example, a round conductor may be flattened at one end or in its course. The flattening can be introduced, for example, by forging, upsetting or the like.

It is also possible for the connecting part to be formed not from a solid material, in particular a single strand of a conductor, but also from a braid or fabric or a multi strand conductor. In this case, a flat area can be formed in the braid, fabric or strands by appropriate forming processes such as upsetting, pressing, welding or the like. A substantially inclusion-free area can be formed on a fabric tape by welding and/or compacting, for example, which can be processed like a solid material, in particular on which a sleeve can be applied.

For an electrical connection of the connecting part to a further connecting part, for example a conductor or the like, it is now proposed that an electrically conductive, in particular metallic sleeve is provided. The sleeve is connected to the connecting part by a material bond. The sleeve has a through-opening extending in its longitudinal direction. The sleeve is connected to the connecting part in particular in such a way that the longitudinal direction of the sleeve runs transversely to the longitudinal direction of the connecting part. In particular, the longitudinal direction of the sleeve runs parallel to the surface normal of the surface of the connecting part to which the sleeve is applied.

For a mechanical connection between the connecting part and the further connecting part, for example a conductor, a bolt is provided in addition to the sleeve. The bolt is connected to the sleeve. The bolt has a bolt shank. The bolt shank is also sleeve-shaped and has at least one blind hole, preferably a through-opening. This hole preferably extends into the bolt starting from the front face facing away from the bolt flange. Preferably, the hole extends as a through-hole between the distal front faces of the bolt. In the longitudinal extension of the bolt it has a flange pointing radially outwards and the bolt shank adjoining it. The bolt flange can also be understood as part of the bolt shank.

According to an alternative, the bolt has a bolt shank and a bolt head.

In the following, the bolt is described in two alternative embodiments. In the first embodiment, the bolt is sleeve-shaped with a through-opening and a bolt flange. Thus, the bolt shank is hollow.

In a second embodiment, the bolt has a bolt shank and a bolt head. The shank and/or the head are made of solid material without an opening.

The following explanations regarding the bolt may, as far as possible, apply to both alternatives. In particular, subsequent embodiments regarding the bolt head may, as far as possible, apply to the bolt flange. In particular, the fastening of the bolt in the sleeve may be the same for both alternatives.

While the sleeve is materially bonded to the connecting part, the bolt may be positively, non-positively and/or materially bonded to the sleeve. In particular, the outer lateral surface of the bolt shaft is in direct contact with the inner lateral surface of the through-opening. In this case, it is possible that a force fit or form fit is formed when the bolt is pushed into the through-opening. In particular, the bolt can also be driven into the through-opening in such a way that the cross-section of the through-opening changes from its original state as a result of the driving-in of the bolt. The bolt thereby plastically deforms the inner lateral surface of the through-opening. This is particularly possible if the bolt is made of a mechanically stronger material than the sleeve.

The sleeve has a recess at its one front face, which is formed to receive the bolt flange/head. When the bolt is inserted into the sleeve, i.e. with its bolt shank inserted in the through-opening, the bolt flange/head lies in the recess at the front face end. The recess has an extension in the longitudinal direction into the sleeve which is preferably greater than the extension of the bolt flange/head in the longitudinal direction of the bolt. Thus, the bolt flange/head is completely received in the recess.

The sleeve is then connected to the connecting part by its front face located at the front face end. The recess accommodates the bolt completely in the sleeve and the front face located at the front face end can be flat. The plane formed by this front face serves as the connection plane for the material connection with the connecting part.

The bolt thus received in the sleeve serves to absorb a tightening force when the second connecting part is clamped between the front face of the sleeve opposite the recess and a screw screwed to the bolt or a nut screwed to the bolt. An electrical path between the then screwed connecting parts occurs primarily from the subject connecting part via the sleeve to the second connecting part clamped to the sleeve. The second connecting part can be formed in accordance with the above explanations for the first connecting part, whereby a through-opening is provided in the flattening or in the flat area, into which the bolt can be inserted with its bolt shaft.

The bolt together with the sleeve thus forms a fastening means for a second connecting part to the first connecting part.

According to an embodiment, it is proposed that the bolt with its collar-shaped, radially outwardly projecting bolt flange/bolt head is mounted at least partially circumferentially on a circumferential shoulder in the recess of the sleeve. The shoulder is formed in the manner of a rebate in the recess of the sleeve. The bolt flange/bolt head projects radially outwardly with respect to the longitudinal direction of the bolt, in particular circumferentially. The cross-section of the bolt flange/bolt head is preferably round, but can also be polygonal, in particular hexagonal or octagonal. The cross-section of the recess can be adapted to the cross-section of the bolt flange/bolt head. Particularly in the case of a polygonal bolt flange/bolt head, this can secure the bolt in the sleeve against a torque directed around the longitudinal axis. This can simplify screwing a connecting part to the sleeve via the bolt.

The recess arranged at the front end of the sleeve preferably completely encloses the through-opening. Thus, the bolt flange/bolt head can be fully inserted into the recess and the bolt flange/bolt head no longer protrudes beyond the front end of the sleeve.

According to an embodiment, it is proposed that the hole is a blind hole or a through-hole. The hole of the bolt shaft preferably has an internal thread. The outer lateral surface of the bolt shaft is pressed into the sleeve. A screw can be screwed into the bolt shaft via the internal thread. This screw can be used to press a second connecting part onto the sleeve and thus onto the first connecting part.

According to an embodiment, it is proposed that the bolt shank protrudes from the through-opening with its shank end at an end of the sleeve distal to the recess. This protruding end is used to attach a second connecting part to the sleeve and consequently the first connecting part.

The bolt shaft may have a uniform cross-section along its longitudinal axis, or it may have different cross-sections. It is thus possible for the bolt shank to have regions with different radial projections in the region in which it is inserted into the through-opening. The through-opening can correspond to this and in particular have a corresponding opening cross section. Thus the bolt shank can be positively received in the region of the through-opening.

According to an embodiment, it is proposed that the bolt has an internal thread in its hole. With this internal thread, the bolt can be screwed with a screw. A second connecting part can be pressed against the sleeve and the bolt with the screw flange of a bolt screwed in this way. In this case, the bolt has a longitudinal extension such that in the inserted state, i.e. when the bolt shank is in contact with the sleeve within the recess, it does not project beyond the through-opening of the sleeve. In particular, the front faces of the sleeve and the bolt shank lie plane-parallel to each other on the side facing away from the recess.

According to an embodiment, it is proposed that one shank end of the bolt has a thread, in particular that the thread projects into the through-opening. Via this thread, the bolt can be screwed to a second connecting part. In particular, by means of a nut, the second connecting part can be pressed against the front face of the sleeve.

As already mentioned, the bolt shank can be positively received in the through-opening. For this purpose, according to an embodiment, the bolt is knurled at least in sections on its outer lateral surface, in particular in an area adjacent to the bolt flange. The knurled part has protrusions and recesses running in the longitudinal direction of the bolt shaft. The knurled part of the bolt shank is preferably pressed into the through-opening by means of an interference fit. This may involve plastic deformation of the inner lateral surface of the through-opening.

As already explained, it is preferred if the bolt is mounted in the sleeve so that it cannot rotate. This can be achieved in particular by pressing the bolt shaft into the through-opening.

According to an embodiment, it is proposed that the bolt flange/bolt head is arranged in the recess at a distance from the front face in the longitudinal direction. This achieves that, on the one hand, the front face can be welded flat to the connecting part and, on the other hand, the bolt flange is not in direct contact with the connecting part in the welded state.

In particular, the sleeve is formed from a copper material and the bolt from steel material. Preferably, the sleeve is made of a material that is more ductile than the material of the bolt. The combination of copper and steel has proved advantageous in this respect. Because the bolt is less ductile than the sleeve, it also offers greater resistance at its thread to shearing of the thread during screwing than if the bolt were formed from the material of the sleeve. The bolt can thus be screwed with a higher tightening torque, in particular a nut screwed onto the thread of the bolt or a screw screwed to the internal thread can be tightened with a higher tightening torque than if the bolt were formed from the material of the sleeve.

According to an embodiment, it is proposed that the sleeve with the front face located at the front face end is friction welded, in particular completely friction welded, to the connecting part. In particular, rotary friction welding can be used here. The sleeve can preferably have an area with different radial expansions. In particular, the outer cross section can be polygonal, so that a friction welding tool with a high torque enables friction welding. In this case, the sleeve does not have to be held in the friction welding tool by means of radially inwardly directed contact forces, but rather the energy can be applied to the outer lateral surface of the sleeve via the form fit between the sleeve and the friction welding tool.

According to an embodiment, it is proposed that a connection part with an opening is placed over the bolt shaft. The connection part has also been described previously as a second connecting part. The connection part may be formed according to the above description of the first connecting part. In particular, the connection part has a flat area or flattening with the opening.

In an alternative, the connection part can be arranged with its opening over the hole of the bolt shaft, in particular in alignment. A screw can then be inserted through the opening of the connecting part and screwed to the internal thread. The head of the screw is thus pressed against the connection part on the surface facing away from the sleeve. The bolt flange clamps the connecting part against the sleeve.

With a nut mounted on the bolt shank, the connection part can be clamped to the sleeve in an alternative. In this case, the nut can be screwed to the bolt shank with a tightening torque. The connection part is clamped to the sleeve via the nut. The connecting part is in direct contact with the end of the sleeve distal to the recess.

An electrical path between the connection part and the connecting part is provided in both alternatives primarily directly via the sleeve.

According to an embodiment, it is proposed that the connecting part, the sleeve and the bolt and the connection part are encapsulated in a common housing, wherein the connecting part and the connection part are led out of the housing in a moisture-tight manner.

BRIEF DESCRIPTION OF THE DRAWINGS

The subject matter is explained in more detail below with reference to drawings showing embodiments. The drawings show.

DETAILED DESCRIPTION OF SPECIFIC EMBODIMENTS

Figure 1A:
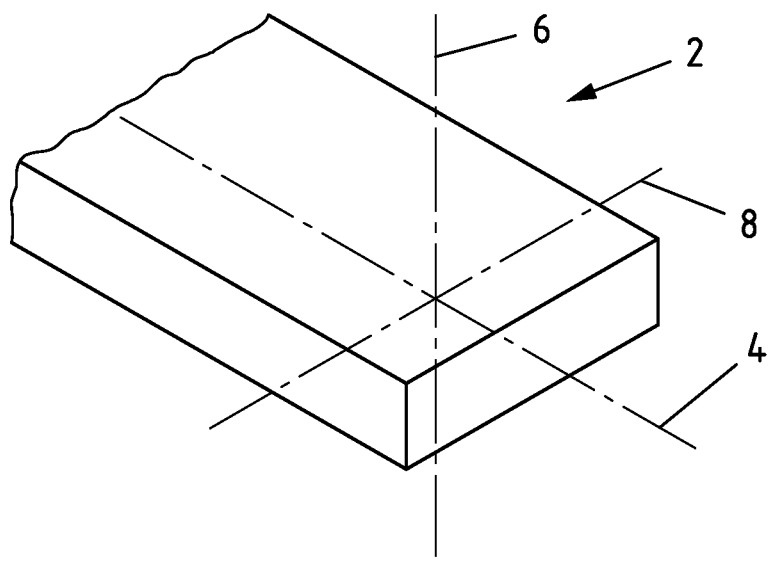
FIG. 1a-d various connecting parts according to embodiments.

FIG. 1a shows a first connecting part according to an embodiment. The connecting part 2 in the example shown is a flat conductor. The connecting part in all variants presented here can be formed from a copper material or an aluminum material.

The connecting part 2 has a longitudinal axis 4, a vertical axis 6 and a transverse axis 8. The connecting part 2 can have one or more flat connecting surfaces, which runs in particular parallel to a plane spanned by two of the axes 4-8.

Figure 1B:
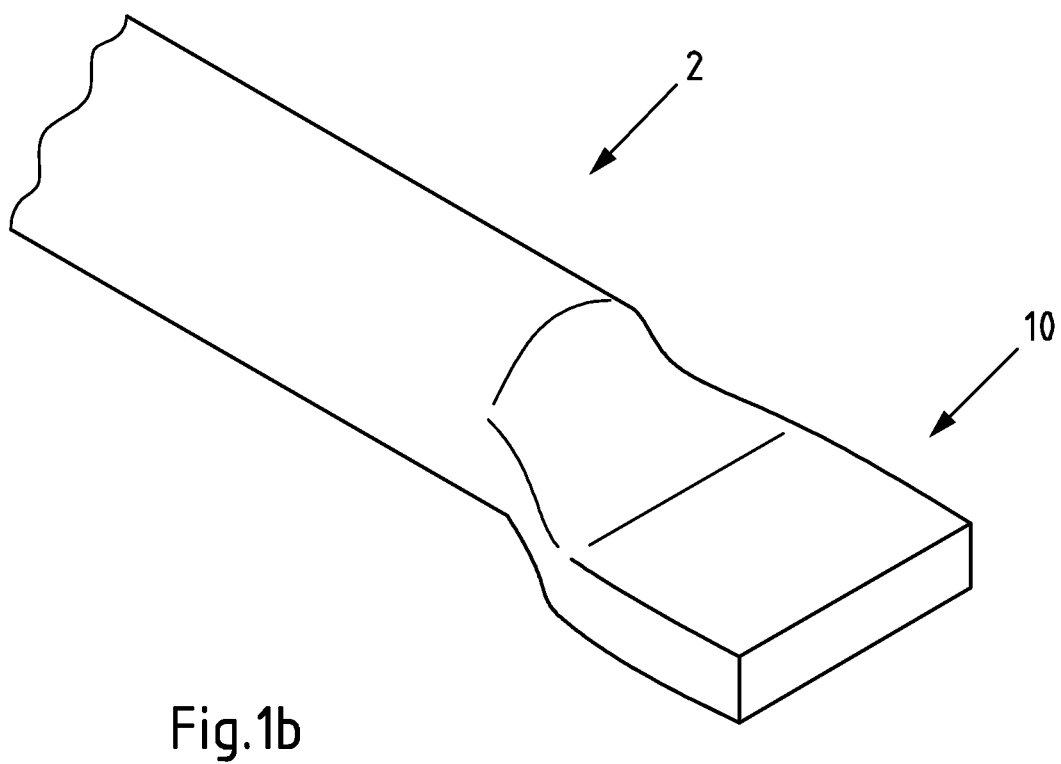

The connecting part 2 according to FIG. 1b may be shaped as a round conductor. A connecting area 10 may be provided at a front end or in the course of the conductor. The connectign area 10 may be formed as a flattening. In particular, the connecting area 10 is formed from the round conductor by upsetting or pressing.

Figure 1C:
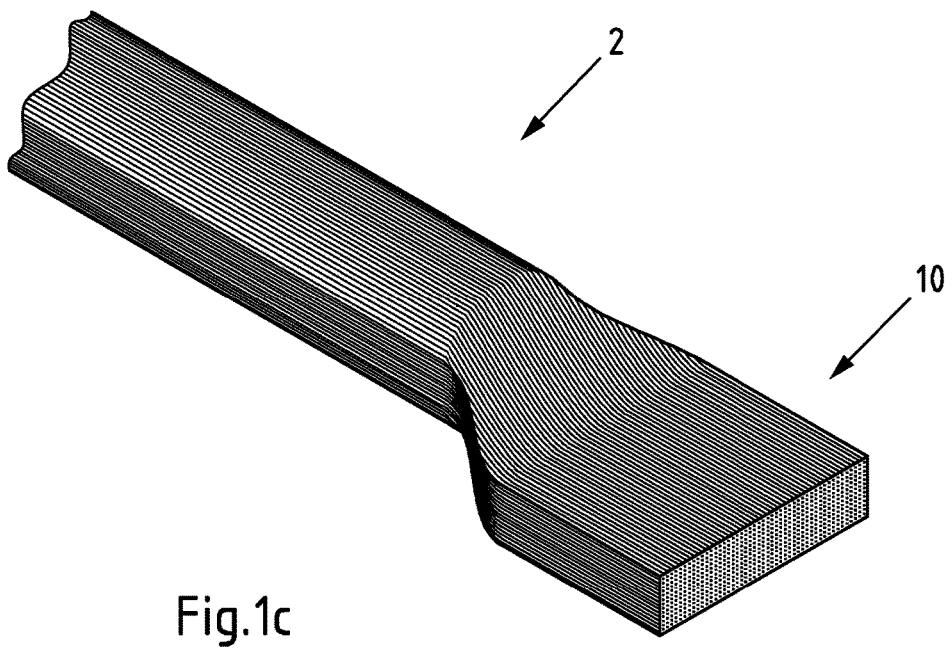

FIG. 1c shows a connecting part 2 as a stranded conductor, in which case a connecting area 10 is also formed at the front face. The stranded conductors can be compacted in the connecting area 10 and in particular welded or soldered together.

Figure 1D:
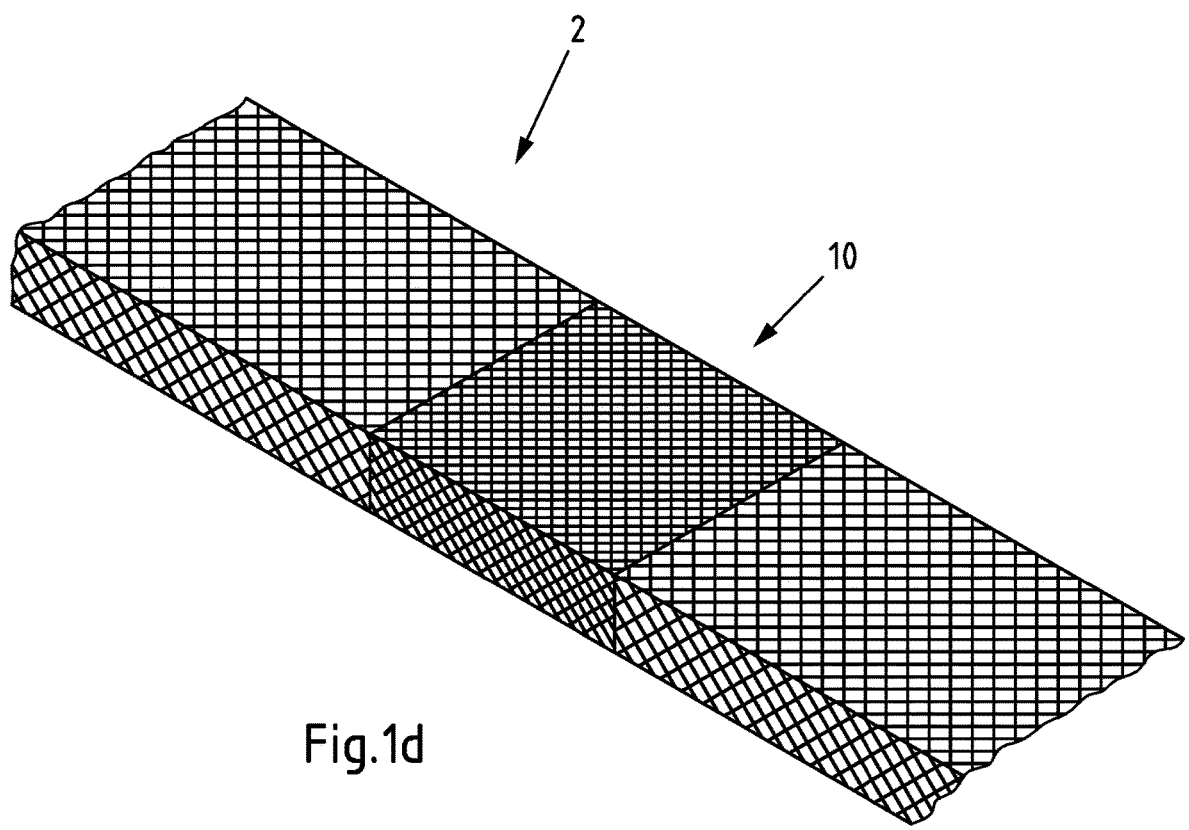

FIG. 1d shows a connecting part 2 as a braided strip. The connecting area 10 can be formed in the course of the braided band or at a front face end. The strands of the braid can be joined to one another in the connecting area 10, in particular joined to one another with a material bond, for example by means of ultrasonic welding or resistance welding. The embodiments described for the embodiments according to FIGS. 1a-d can be combined as desired for different connection parts 2.

A sleeve is now proposed for connecting a connecting part 2 to a connection part.

Figure 2A:
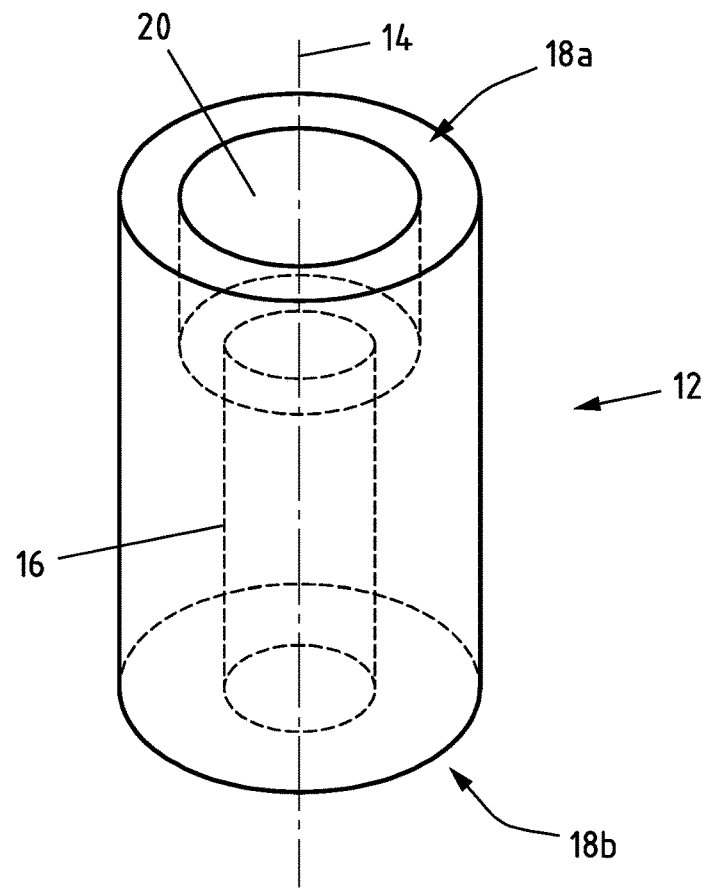
FIG. 2a, b views of sleeves according to embodiments.

FIG. 2a shows a sleeve 12. The sleeve 12 has a longitudinal axis 14. The sleeve 12 has a through-opening 16. The through-opening 16 extends from a first front face end 18a to a second front face end 18b. The longitudinal axis 14 extends between the two front face ends 18a, b. In the region of a front face end 18a, the sleeve 12 has a recess 20. The recess 20 is preferably circumferentially bordered by the outer lateral surface of the sleeve 12. In the region of the recess 20, in particular centrally in the recess 20, the through-opening 16 is provided.

Figure 2B:
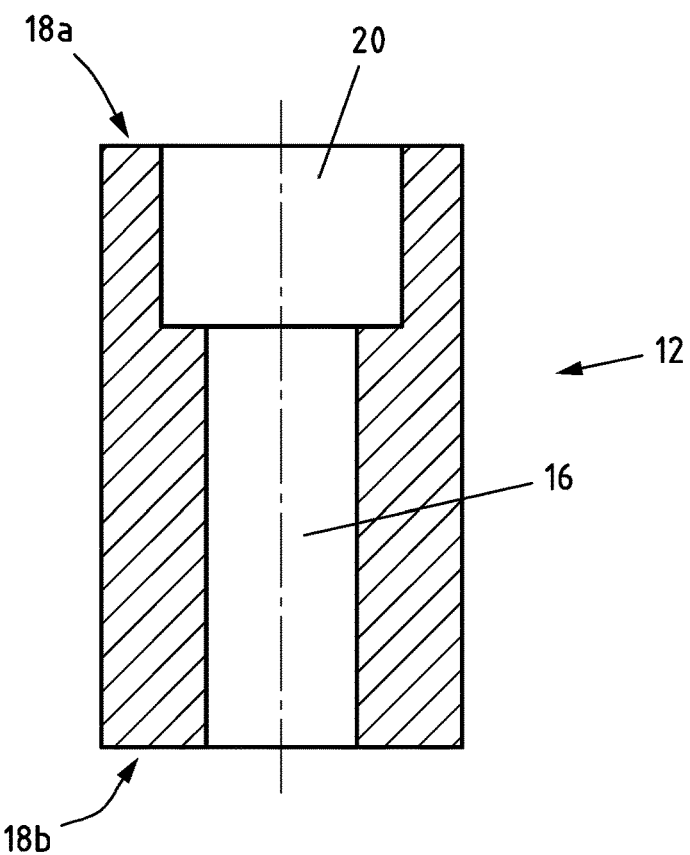

FIG. 2b shows the sleeve 12 in a longitudinal section. The recess 20 can be seen. It can also be seen that the sleeve 12 surrounds the recess 20 circumferentially. The through-opening 16 extends from the recess 20 toward the front end 18b.

Sleeve 12 is preferably made of a copper material or aluminum material. In particular, sleeve 12 is made of the same material as the connecting part 2. Materials can in particular be alloys, such as brass as a copper alloy.

The outer lateral surface as well as the cross-section of the recess 20 as well as of the through-opening 16 can be round or angular, in particular circular, elliptical or polygonal in shape.

Figure 3A:
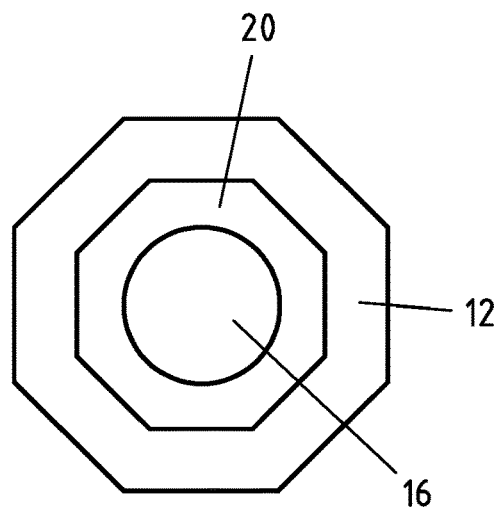
FIG. 3a-c top views of front faces of sleeves with recesses according to embodiments.
Figure 3B:
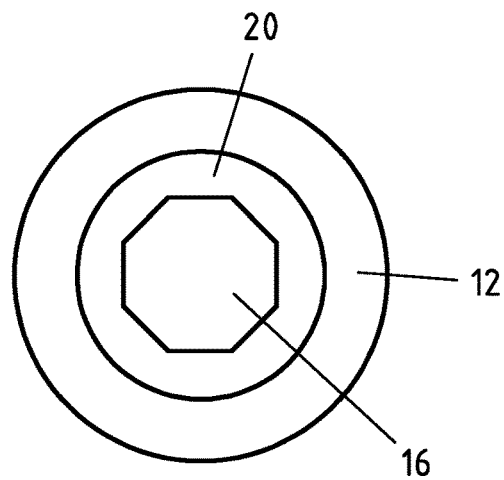
Figure 3C:
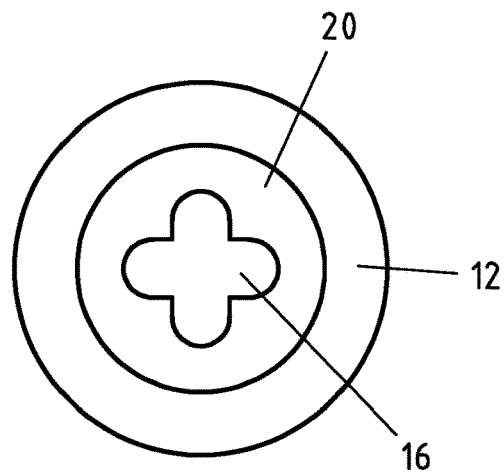

FIGS. 3a-c show various embodiments of the sleeve in a plan view. In FIG. 3a, the outer lateral surface of the sleeve 12 is octagonal. The recess 20 is adapted in cross-section thereto and is also octagonal. Inside the recess 20, the through-opening 16 is arranged with a round cross-section.

FIG. 3b shows a further embodiment in which the outer lateral surface of the sleeve 12 as well as the recess 20 are round, in particular circular. The through-opening 16 within the recess 20, on the other hand, is hexagonal in shape.

FIG. 3c shows, in contrast to FIG. 3b, the through-opening 16 with a star-shaped cross-section. A wide variety of shapes can be combined with one another.

Figure 4:
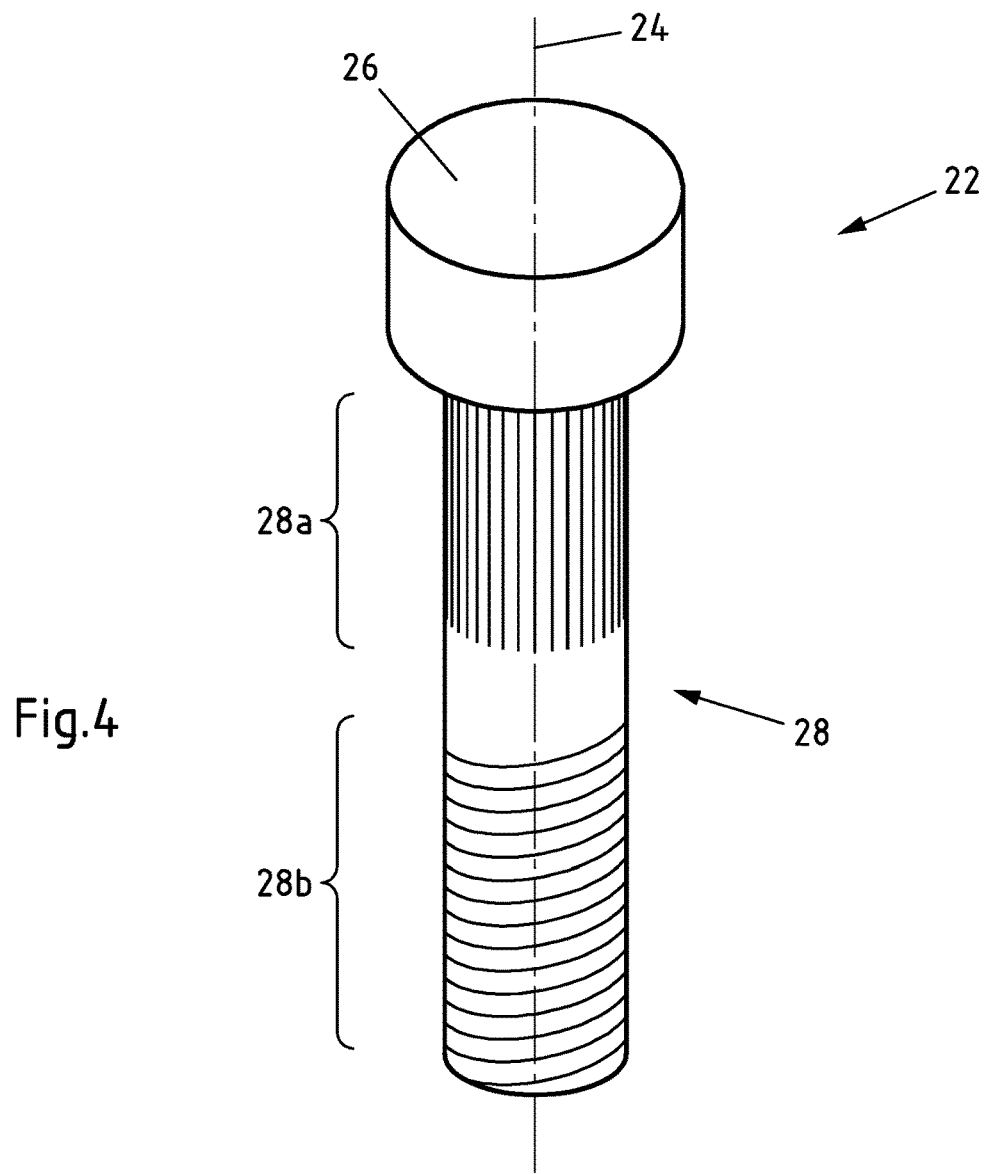
FIG. 4 a view of a bolt according to an embodiment.

FIG. 4 shows a bolt 22. The bolt 22 has a longitudinal axis 24. The bolt 22 has a bolt head 26 and a bolt shank 28. The bolt shank 28 extends along the longitudinal axis 24. The bolt shank 28 may have a first region 28a and a second region 28b. The first portion 28a is preferably inserted into the through-opening 16, and the second portion 28b extends beyond the front end 18b. In the region 28a, the bolt shank 28 may be knurled in the direction of the longitudinal axis 24, whereas the region 28b of the bolt shank 28 may be threaded.

Figure 5A:
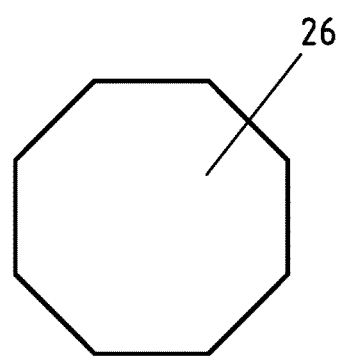
FIG. 5a, b top views of bolt flanges according to embodiments.
Figure 5B:
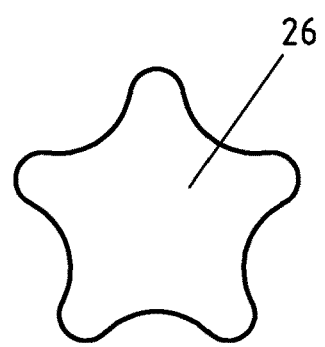

The cross-section of the bolt head 26, as shown in FIGS. 5a and b, may be adapted to a cross-section of the recess 20. For example, FIG. 5a shows a bolt head 26 with an octagonal cross-section, whereas FIG. 5b shows a bolt head 26 with a star-shaped cross-section. These and other cross sections are conceivable. The cross sections of bolt head 26 and recess 20 can be congruent with each other, so that bolt head 26 can be positively received in recess 20. This positive fit results in an anti-rotation lock of the bolt 22 in the through-opening 16, so that the bolt 22 can be screwed to the sleeve 12 via the thread in the area 28b.

Figure 6A:
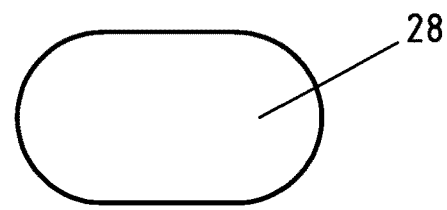
FIG. 6a-c cross-sections of bolt shanks according to embodiments.
Figure 6B:
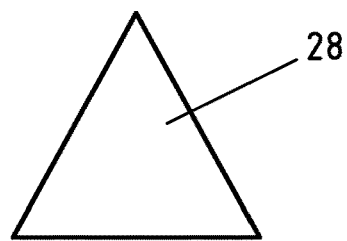
Figure 6C:
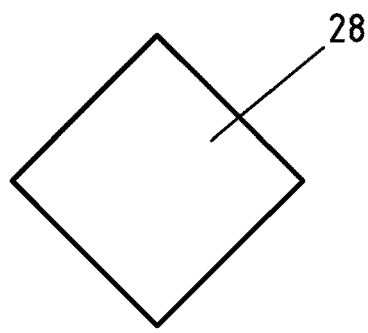

In addition to various cross-sections of the bolt head as shown in FIGS. 5a, b, the bolt shank 28 may also have a cross-section that is not circular, particularly in the region 28a. For example, FIG. 6a shows a bolt shank 28 in region 28a that is oval. FIG. 6b shows a bolt shaft 28 in a cross-section in region 28a that is triangular, and FIG. 6c shows a corresponding quadrangular cross-section.

The through-opening 16 as well as the cross section of the bolt shaft 22 in the area 28a may be congruent to each other. Also, it is possible for the knurling in area 28a to be such that its maximum diameter is slightly larger than the diameter of the through-opening 16 so that when the bolt 22 is pushed into the through-opening 16, an interference fit is formed between the bolt 26 in area 28a and the through-opening 16. In this case, the knurling can lead to plastic deformation of the inner lateral surface of the through-opening 16.

Figure 7A:
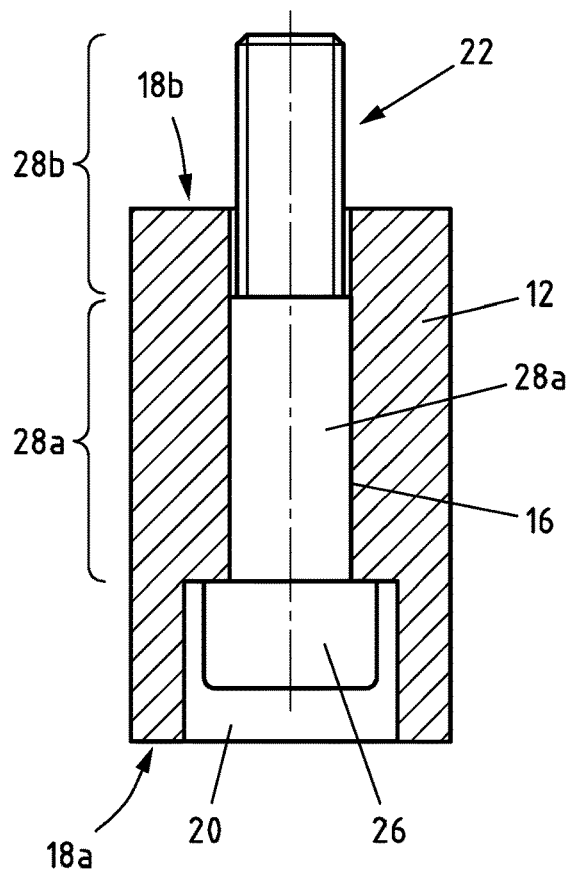
FIG. 7a-c the production of a connection according to an embodiment.
Figure 7B:
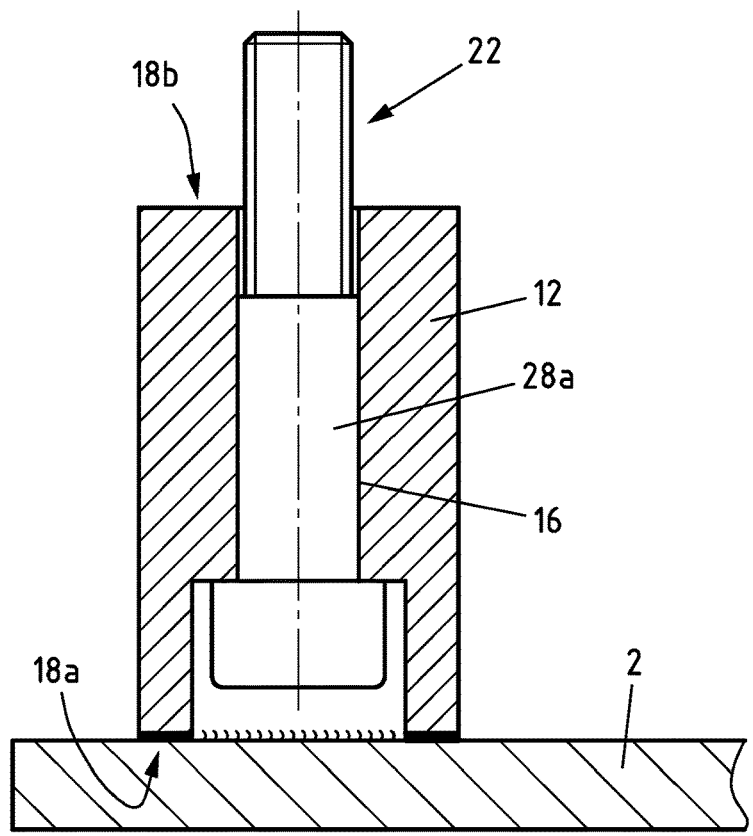
Figure 7C:
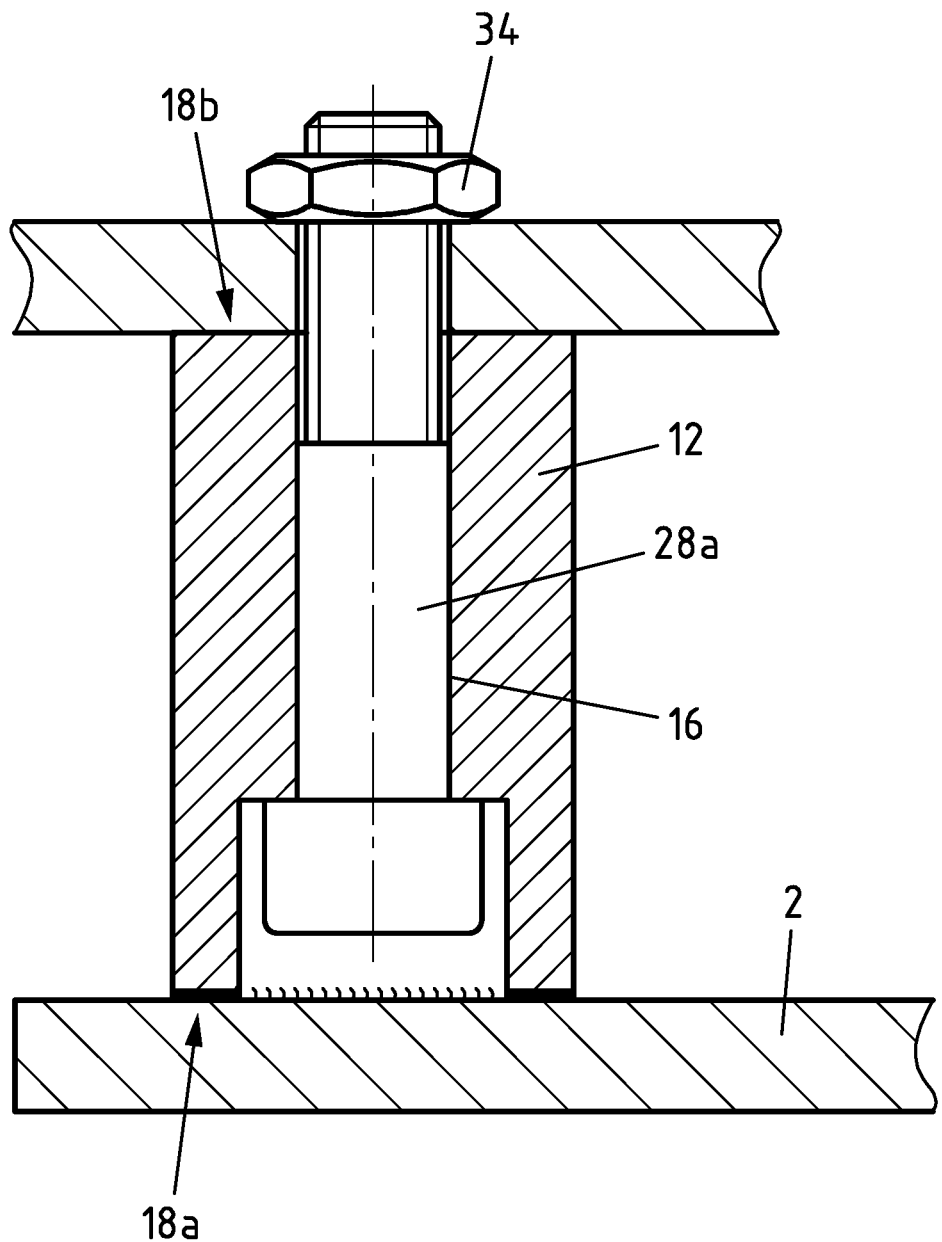

FIGS. 7a-c illustrate the production of a connection according to the subject matter. First (FIG. 7a), the bolt 22 is inserted into the sleeve 12 so that the bolt head 26 is recessed in the recess 20. The bolt shank 28 has its region 28a within the through-opening 16, whereas the bolt shank 28 has its region 28b protruding from the front end 18b of the sleeve 12.

After the bolt 22 has been inserted into the through-opening 16, the sleeve 12 is joined to the connecting part 2 in the region of the front face end 18a, in particular welded (FIG. 7b). Here, a welding tool can press the sleeve 12 against the connecting area 10 by means of friction welding and cause the joining partners to melt by the rotational energy introduced. Resistance welding can also be performed.

After the sleeve 12 has been welded onto the connecting part 2, a connection part 30, which may be shaped in accordance with a connecting part described herein or in a shape deviating therefrom, can be fastened to the bolt 22, in particular screwed. The connection part 30 is in particular a cable, in particular as described in FIGS. 1a-d.

The connection part 30 has a through-opening 32. With the through-opening 32, the connection part 30 is fitted onto the bolt 22, in particular the bolt shaft 28 in the region 28b. A nut 34 is then screwed onto the bolt 22. During screwing, the nut 34 presses the connection part 30 against the front face end 18b of the sleeve 12.

The bolt 22 is preferably formed from a harder material than the sleeve 12, which means that the nut 34 can be screwed on with a higher tightening torque than if the bolt 22 were formed from the material of the sleeve 12. In particular, the sleeve 12 is made of a copper material or aluminum material and the bolt 22 is made of a steel material.

Figure 8:
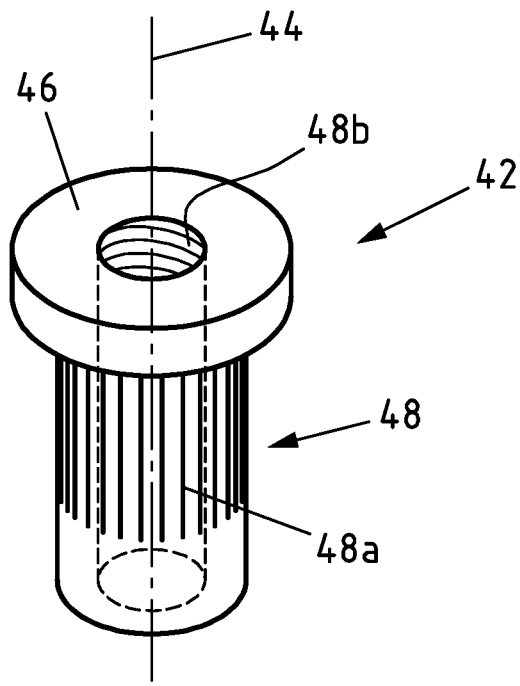
FIG. 8 a view of a bolt according to an embodiment.

FIG. 8 illustrates a bolt 42. The bolt 42 has a longitudinal axis 44. The bolt 42 has a bolt flange 46 and a bolt shank 48. The bolt shank 48 extends along the longitudinal axis 44. The bolt shank 48 may have a knurl 48a on its outer peripheral surface. The bolt shank may include a hole 48b, particularly a through-hole. The bolt 48 is inserted into the through-opening 16. The bolt 48 has a longitudinal extension corresponding to that of the through-opening 16 such that, in the inserted state, the bolt 48 is flush with the front face of the sleeve 12 on the front face opposite the recess 20. An internal thread may be provided in the hole 48b over at least parts of the longitudinal extent of the bolt 48. In particular, the internal thread is in an area remote from the bolt flange 46, but may extend to or into the bolt flange 46.

Figure 9A:
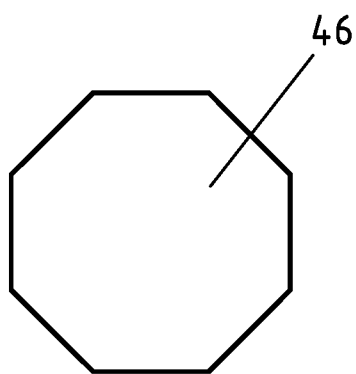
FIG. 9a, b top views of bolt flanges according to embodiments.
Figure 9B:
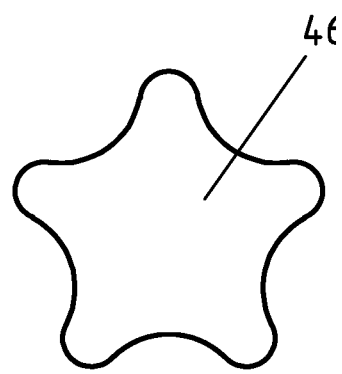

The bolt flange 46 may be adapted in its cross-section, as shown in FIGS. 9a and b, to a cross-section of the recess 20. For example, FIG. 9a shows a bolt flange 46 with an octagonal cross-section, whereas FIG. 9b shows a bolt flange 46 with a star-shaped cross-section. These and other cross sections are conceivable. The cross sections of bolt flange 46 and recess 20 can be congruent with each other, so that bolt flange 46 can be positively received in recess 20. This positive fit results in an anti-rotation fit of the bolt 42 in the through-opening 16, so that the bolt 42 can be screwed to the sleeve 12 via the internal thread.

Figure 10A:
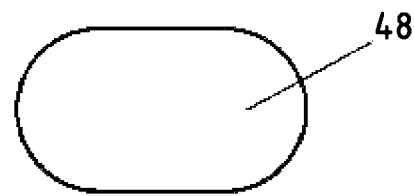
FIG. 10a-c cross-sections of bolt shanks according to embodiments.
Figure 10B:
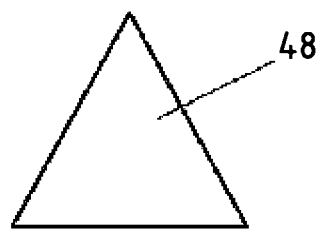
Figure 10C:
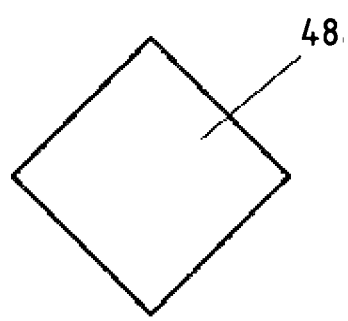

In addition to various cross-sections of the bolt flange according to FIGS. 9a, b, the bolt shank 48, in particular in the region of the knurling 48a, may also have a cross-section that is not circular. Thus, FIG. 10a shows a bolt shank 48 that is oval. FIG. 10b shows a bolt shank 48 in a cross-section that is triangular, and FIG. 10c shows a corresponding quadrangular cross-section.

The through-opening 16 as well as the cross section of the bolt shaft 48 may be congruent to each other. Also, it is possible for the knurling 48a to be such that its maximum diameter is slightly larger than the diameter of the through-opening 16 so that when the bolt 42 is pushed into the through-opening 16, an interference fit is formed between the bolt 46 and the through-opening 16. Here, the knurling 48a may result in plastic deformation of the inner lateral surface of the through-opening 16.

Figure 11A:
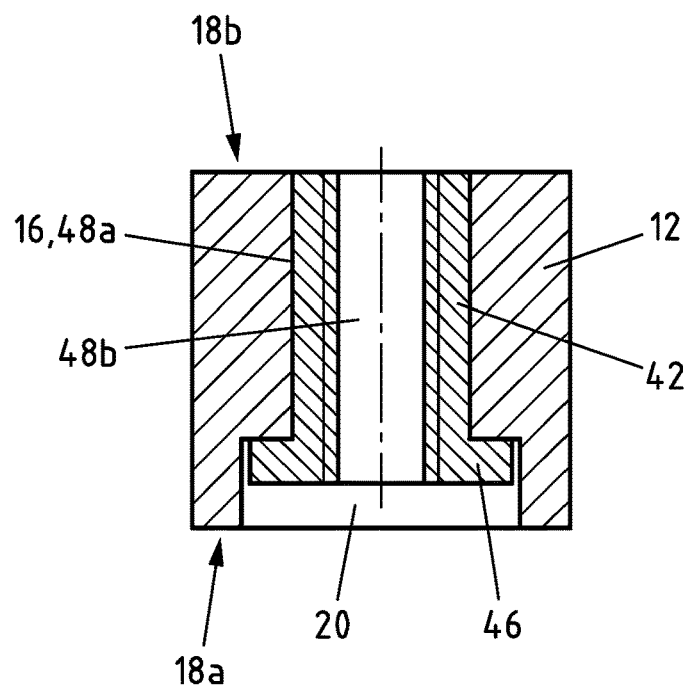
FIG. 11a-c the production of a connection according to an embodiment.
Figure 11B:
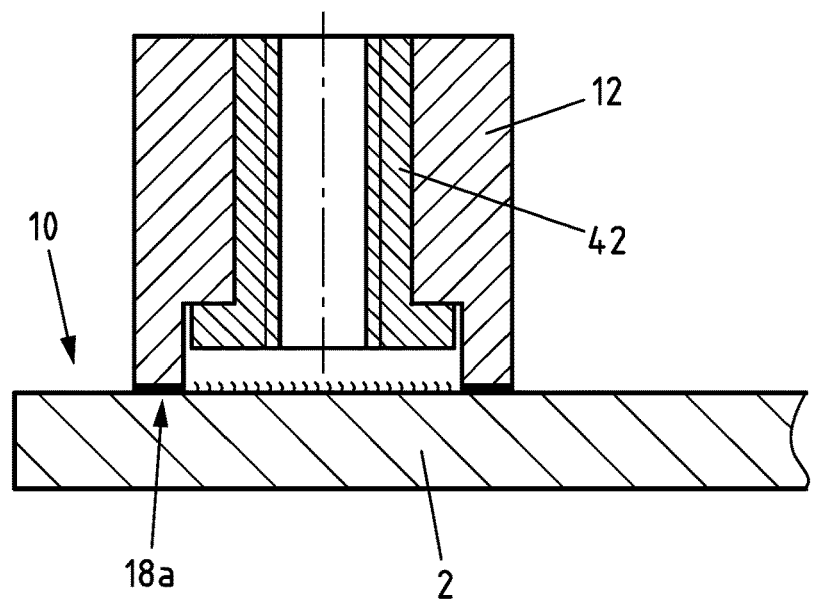
Figure 11C:
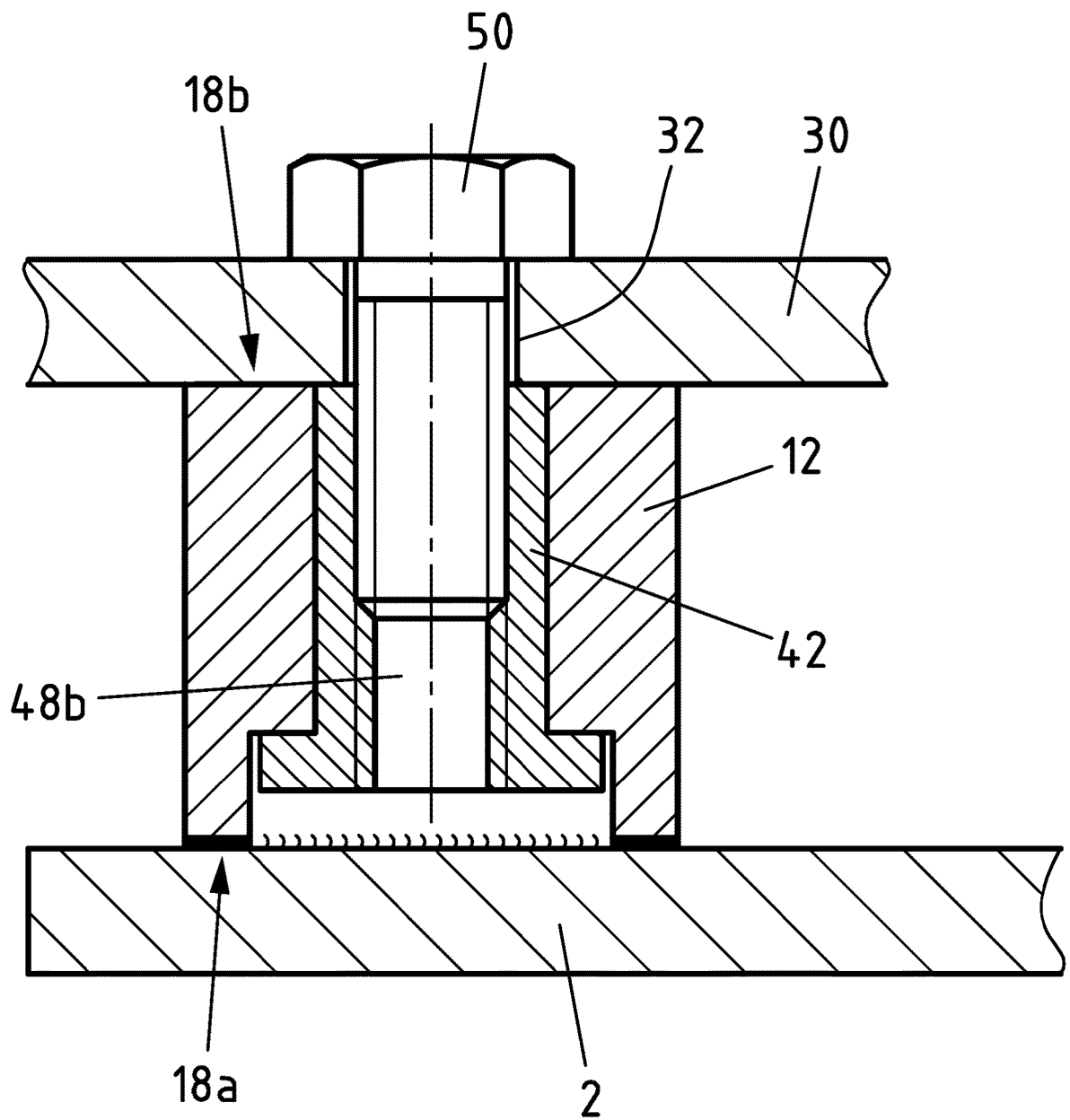

FIGS. 11a-c illustrate the production of an objective connection. First (FIG. 11a), the bolt 42 is inserted into the sleeve 12 so that the bolt flange 46 is recessed in the recess 20. The bolt shank 48 lies within the through-opening 16, and the bolt shank 48 has a length equal to the length of the through-opening. As a result, the bolt shank 48 lies with its front face flush with the outer front face 18b of the sleeve 12. Also, the bolt shank 48 may be shorter so that it recedes behind the front face 18b of the sleeve 12.

After the bolt 42 has been inserted into the through-opening 16, the sleeve 12 is joined, in particular welded, to the connecting part 2 in the region of the front face 18a (FIG. 11b). Here, a welding tool can press the sleeve 12 against the connecting area 10 by means of friction welding and cause the joining partners to melt by the rotational energy introduced. Resistance welding can also be performed.

After the sleeve 12 has been welded onto the connecting part 2, a connection part 30, which may be shaped in accordance with a connecting part described herein or in a shape deviating therefrom, can be fastened to the bolt 42, in particular screwed. The connection part 30 is in particular a cable, in particular as described in FIGS. 1a-d.

The connection part 30 has a through-opening 32, and with the through-opening 32, the connection part 30 is aligned with the bolt 42 and the sleeve 12 such that the through-opening 32 is aligned with the hole 48b. A screw 50 is then screwed into the hole 48b of the bolt 42 with the internal thread. As the bolt 50 is screwed into place, it presses the connecting member 30 against the front end 18b of the sleeve 12.

The bolt 42 is preferably formed of a harder material than the sleeve 12, which results in the screw 50 being able to be screwed with a higher tightening torque than if the bolt 42 were formed of the material of the sleeve 12. In particular, the sleeve 12 is formed of a copper material or aluminum material and the bolt 42 is formed of a steel material.

An electrical connection between the connection part 30 and the connecting part 2 is made in particular via the sleeve 12. The bolt 22 preferably serves to mechanically fix the connection part 30 to the sleeve 12, which in turn is joined to the connecting part 2 in the region of the front face end 18a by a material bond.

LIST OF REFERENCE SIGNS

2 Connecting part
4 Longitudinal axis
6 Vertical axis
8 Transverse axis
Connection area
12 Sleeve
14 Longitudinal axis
16 Through opening
18a, b End face
20 Recess
22, 42 Bolt
24, 44 Longitudinal axis
26, 46 Bolt flange
28, 48 Bolt shank
28a, b Range
48a Knurling
48b Hole with thread
30 Connecting part
32 Through-hole
34 Nut
50 Screw

What is claimed is:

1. A connection comprising:
   a connecting part;
   a sleeve materially bonded to the connecting part and having a through-opening extending in a longitudinal direction; and
   a bolt connected to the sleeve and having a bolt shank with a hole extending in a longitudinal direction of the bolt shank and a bolt flange, wherein the bolt is press-fitted with its bolt shank in the longitudinal direction in the through-opening of the sleeve, the bolt being arranged with its bolt flange in a recess arranged at a front face end of the sleeve,
   wherein the sleeve is materially bonded to the connecting part with its front face located
   at the front face end.

2. The connection according to claim 1, wherein the bolt with its collar-shaped, radially outwardly projecting bolt flange is mounted at least partially circumferentially on a circumferential shoulder in the recess of the sleeve.

3. The connection according to claim 1, wherein the recess arranged at the front face end of the sleeve encloses the through-opening of the sleeve.

4. The connection according to claim 1, wherein the hole is a blind hole that extends in the longitudinal direction of the bolt between two front face ends of the bolt.

5. The connection according to claim 1, wherein the hole is a through-hole that extends in the longitudinal direction of the bolt between two front face ends of the bolt.

6. The connection according to claim 1, wherein the hole has an internal thread that extends only partially over the longitudinal extent of the bolt.

7. The connection according to claim 1, wherein the bolt shank is knurled at least in sections on its outer lateral surface, in particular in an area adjacent to the bolt flange, and the knurled part is press-fitted into the through-opening.

8. The connection according to claim 1, wherein the bolt is pressed into the through-opening in a non-rotatable manner.

9. The connection according to claim 1, wherein the bolt flange is arranged in the recess in the longitudinal direction at a distance from the front face.

10. The connection according to claim 1, wherein the sleeve is formed of a copper material and/or that the bolt is formed of steel.

11. The connection according to claim 1, wherein the sleeve is friction-welded, in particular full-area friction-welded, in particular rotary friction-welded, to the connecting part with the front face located at the front face end.

12. The connection according to claim 1, wherein a connection part with an opening is placed over the hole of the bolt and is clamped to the sleeve by a screw via the thread in the hole of the bolt, so that the connection part is in direct contact with the end of the sleeve distal to the recess.

13. The connection according to claim 12, wherein the connecting part, the sleeve, the bolt and the connection part are encapsulated in a common housing, the connecting part and the connection part being guided out of the housing in a moisture-tight manner.

* * * * *